US006619031B1

United States Patent
Balepin

(10) Patent No.: US 6,619,031 B1
(45) Date of Patent: Sep. 16, 2003

(54) MULTI-MODE MULTI-PROPELLANT LIQUID ROCKET ENGINE

(76) Inventor: Vladimir V. Balepin, 3350 Keokuk St., Butte, MT (US) 59710

( * ) Notice: Subject to any disclaimer, the term of this patent is extended or adjusted under 35 U.S.C. 154(b) by 0 days.

(21) Appl. No.: 09/842,535

(22) Filed: Apr. 25, 2001

Related U.S. Application Data

(60) Provisional application No. 60/200,129, filed on Apr. 27, 2000.

(51) Int. Cl.$^7$ .................................................. F02K 5/00
(52) U.S. Cl. ......................................................... 60/246
(58) Field of Search ........................... 60/246, 257, 260

(56) References Cited

U.S. PATENT DOCUMENTS

| | | | |
|---|---|---|---|
| 3,747,339 A | | 7/1973 | Wolf et al. |
| 3,756,024 A | * | 9/1973 | Gay ............................. 60/204 |
| 3,768,254 A | * | 10/1973 | Stuart .......................... 60/204 |
| 3,775,977 A | | 12/1973 | Builder et al. |
| 3,797,239 A | * | 3/1974 | Hausmann et al. ........... 60/268 |
| 4,073,138 A | | 2/1978 | Beichel |
| 4,393,039 A | | 7/1983 | Sherman |
| 4,771,600 A | | 9/1988 | Limerick et al. |
| 4,782,655 A | * | 11/1988 | Weber .......................... 60/772 |
| 4,831,818 A | | 5/1989 | Martin |
| 4,893,471 A | * | 1/1990 | Huling ......................... 60/204 |
| 5,025,623 A | | 6/1991 | Hirakoso et al. |
| 5,048,597 A | * | 9/1991 | Bond ........................... 165/41 |
| 5,101,622 A | | 4/1992 | Bond |
| 5,154,051 A | * | 10/1992 | Mouritzen ................... 60/257 |

OTHER PUBLICATIONS

D. Huzel and D Huang, "Modern Engineering for Design of Liquid–Propellant Rocket Engines" Vol 147, AIAA Series Progress in Astronautics and Aeronautics pp. 35, 36 (1992).
G. Oates, "Aerothermodynamics of Gas Turbine and Rocket Propulsion," AIAA Education Series, p. 52 (1988).
H. Hirakoso et al. "A Concept of Lace for Space Plane to Earth Orbit," Int. J. Hydrogen Energy, Vol 15, No. 7, pp 495–505 (1990).
Y. Miki, et al., "Advanced Scram–Lace System Concept for Single–Stage–to–Orbit Space Plane," IAF–91–272, pp 1–6 International Astronautical Federation (1991).
V. Balepin, et al., "Lightweight Low Cost Klin Cycle Derivative for a Small Reusable Launcher," AIAA–99–4893, pp 1–5, AIAA (Nov. 1–4, 1999).
M. Togawa, et al., "A Concept of Lace for SSTO Space Plane" AIAA–91–5011, pp 1–6, AIAA (1991).

\* cited by examiner

Primary Examiner—Ehud Gartenberg
(74) Attorney, Agent, or Firm—Ralph F. Crandell

(57) ABSTRACT

A multi-mode multi-propellant rocket engine capable of operating in a plurality of selected modes.

$$\frac{G_f(K_X + 1)C^*}{A^* P_0} = 1$$

Propellant components may include liquid hydrogen, liquid hydrocarbon, liquid oxygen, liquid fluorine, and liquid air. The liquid oxygen and the liquid air are stored in separate tanks are mixed in a dedicated mixer prior to their injection into the combustion chamber.

3 Claims, 5 Drawing Sheets

MULTI-MODE MULTI-PROPELLANT LIQUID ROCKET ENGINE

CROSS-REFERENCE TO RELATED APPLICATION

This application claims the benefit of Provisional Application Ser. No. 60/200,129, filed Apr. 27, 2000, by Vladimir V. Balepin, for LIQUID AIR AUGMENTED ROCKET ENGINE, the disclosure of which is incorporated herein by this reference.

BACKGROUND OF THE INVENTION

1. Field of the Invention

The present invention relates to liquid propellant rocket engines and particularly to multi-mode multi-propellant single stage earth to orbit or suborbital rocket engines.

2. Description of the Prior Art

Rocket propulsion for earth to orbit launch vehicles is currently the only practical choice. Known rocket engines, however, operate at efficiencies that are far from the optimum, particularly for single stage earth to orbit operation. While many solutions for the enhancement of liquid fuel rocket engines have been proposed, few of them have been implemented. Most innovations lead to significant design complications and cost increases which offset their potential benefits. As a result, principles discovered early in the 20th century, such as for example multistage rockets, still provide the main basis for modern rocket launchers. It is well known from rocket theory that launcher efficiency can be increased if high thrust, dense propellant, moderate specific impulse engines are used at low altitudes for the initial acceleration, and high specific impulse, lower thrust engines are used for high altitude acceleration and orbiting. Liquid propellant combinations embodying oxidizers and fuels which have been considered are liquid oxygen(LOX)/kerosene and liquid oxygen (LOX)/liquid hydrogen(LH2) engines; LOX/methane and LOX/LH2 engines; and solid propellant motors and LOX/LH2 engines. Rocket engines using such fuel combinations have been built and tested, and most of them are workhorses for modern launch businesses. The use of different pairs of fuels for different hardware units essentially requires a multistage configuration of rocket engines. Single-stage-to-orbit (SSTO) launchers are not feasible because idling groups of engines must be carried. Multistage configurations further result in high launch costs and prevent introduction of reusability. The use a fuel efficient LOX/LH2 engine as the only thruster for SSTO launchers is unlikely to be successful because such an engine is not efficient when used as a low altitude thruster.

U.S. Pat. Nos. 4,771,599 and 4,771,600 disclose tripropellant rocket engines utilizing a tripropellant fuel system in which the propellants are oxygen, hydrogen, and a hydrocarbon. Such an engine will produce the thrust necessary for initial acceleration of significant payloads into low earth orbit. This engine is referred to as a booster or high thrust low altitude engine providing for initial acceleration of the launcher, and it has only one operational mode. It is not advantageous to use this engine for high-speed acceleration and orbiting because it has a lower specific impulse than the conventional LOX/LH2 engine.

U.S. Pat. No. 4,831,818 discloses a dual-fuel, dual-mode single stage rocket engine for earth to orbit operation. The fuels are a high specific impulse fuel such as liquid hydrogen, and a high density-impulse fuel such as liquid methane. Flow of the fuels is said to be controlled by the fuel pumps. The fuels are used to cool the nozzle. The fuels are mixed upstream of the nozzle cooling jacket, and the fuel mixture is fed to the cooling jacket. A method is described wherein the mixture of fuels is varied to provide a progressively less dense mixture while providing thrust.

U.S. Pat. No. 5,101,622 discloses a rocket engine capable of operating in two propulsive modes for near earth and low earth orbit operations. It describes a first mode in which the external atmosphere is the source of oxidizer for the fuel. At a high Mach number the engine changes to a second mode which is that of a conventional high performance rocket engine using liquid oxygen carried on the vehicle to oxidize a liquid hydrogen fuel. The engine is said to use common hardware including a liquid hydrogen pump and a combustor nozzle assembly. The mechanism required to match the working fuel and oxidizer flow in both propulsive modes is not disclosed. The engine further includes several turbocompressors to compress air to a delivery pressure of several hundred bars, a series of heat exchangers, and turbopumps, all of which make the engine complicated and expensive to produce and operate and its mass prohibitively high.

A liquid air cycle engine, or LACE, is another example of the propulsion were one of the propellant components, in this case oxidizer, can be changed during flight. Liquid oxygen used on the main acceleration mode can be completely or partially replaced by liquefied ambient air during the first propulsive mode beginning at the initial launch or take off through acceleration from sea level atmospheric conditions to moderate speed and altitude. Such an engine is shown and described in H. Hirakoso, "A Concept of LACE for Space Plane to Earth Orbit," Int. J. Hydrogen Energy, Vol. 15, No. 7, pp. 495–505, at p. 499, 1990.

There is a clear intention in the LACE concepts to maximize the air condensation ratio in an effort to achieve maximum specific impulse or Isp. No real attention is paid, however, to complications to the engine resulting from the necessary additional pumps, plumbing, valves, etc. As a result, the LACE shows inadequate performance gain and/or prohibitively complicated and heavy design. None of the known LACE descriptions suggest the mechanism to match gas flow through the nozzle throat in both the combined and the rocket modes.

Fuel storage systems for rocket engines are shown in U.S. Pat. No. 5,804,760, and U.S. Pat. No. 5,705,771.

The present invention can be based upon existing rocket engines using an expander cycle (RL10 of Pratt& Whitney), gas generator cycle (J2 of Boeing-Rocketdyne), tap-off cycle (J2S, RS2000 of Boeing-Rocketdyne), or a staged combustion topping cycle (SSME of Boeing-Rocketdyne) known in the art. Various examples of rocket engines can be found in D. Huzel and D. Huang, "Modern Engineering for Design of Liquid-Propellant Rocket Engines," Volume 147 of AIAA Series "Progress in Astronautics and Aeronautics," pages 35, 36, (1992).

DESCRIPTION OF THE INVENTION

Figure 1:
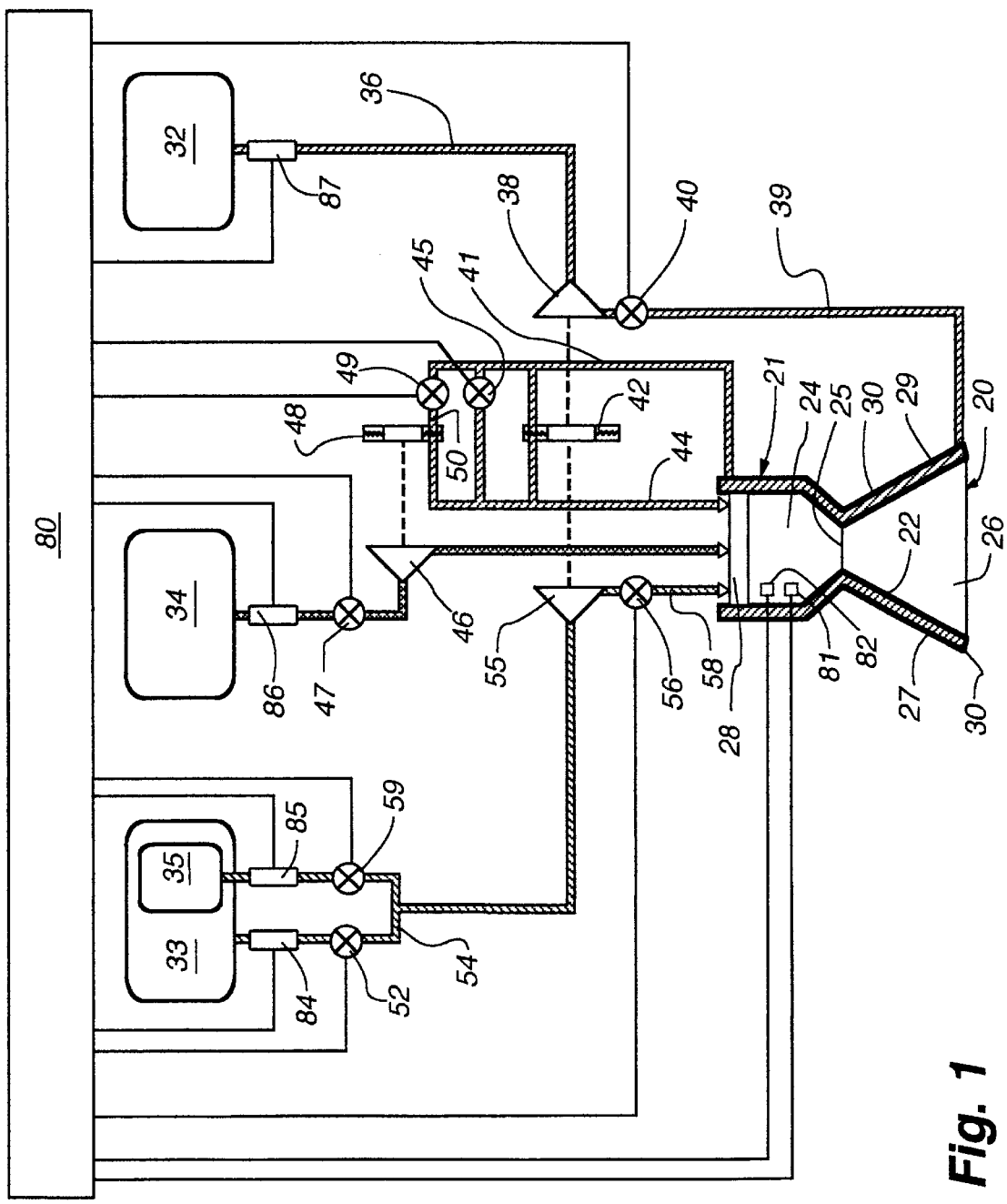
FIG. 1 is a diagrammatic cross-sectional view of a multi-propellant multi-mode rocket engine (MPLRE) embodiment of the present invention.

The present invention is embodied in a new, novel and unobvious multi-propellant, multi-mode-rocket engine 20 as shown in FIG. 1, and in the method of operation thereof. The rocket engine 20 is formed by a combustor 21 having a shell 22 defining a cylindrical combustor chamber 24 opening at one end through a throat 25 into a wide nozzle 26. At its other end the chamber 22 supports an injector head 28 through which propellant fuel and oxidizer components are introduced into the combustor chamber 24 in which they are ignited and burn to produce exhaust gases to provide the desired thrust.

The combustor 21 is provided with an external cooling jacket or shell 29 defining a cooling passage 30 adapted to receive one of the fuel components such as liquid hydrogen as a coolant for the nozzle 26 and combustor 21.

Propellant components in the form of fuels and oxidizers are fed to the injector head from storage tanks therefor. Referring to FIG. 1, propellant component storage tanks include a liquid hydrogen tank 32, a liquid oxygen tank 33, a liquid hydrocarbon tank 34, and a supplemental oxidizer tank 35 for a supplemental oxidizer such as liquid fluorine.

For cooling the combustor 21, hydrogen fuel is fed from the tank 32 through a conduit 36 to a turbine driven hydrogen pump 38 and thence through a conduit 39 having a main hydrogen control valve 40 to the cooling chamber passage 30 define by the cooling jacket 29. From the cooling jacket 29 the liquid hydrogen, now warmed by the combustor, flows through a conduit 41 and by expanding drives a pump turbine 42. From the turbine 42 the hydrogen flows through a conduit 44 to the engine injector head 28. To control the turbine speed, a bypass valve 45 allows warmed liquid hydrogen to bypass the turbine 42, thereby controlling the amount of hydrogen flowing through the turbine 42.

For driving a secondary pump 46 to feed hydrocarbon fuel from the hydrocarbon supply tank 34 through a control valve 47 to the engine, a secondary turbine 48 is also driven by expanding a portion of the hydrogen as determined by a control valve 49 in the hydrogen supply conduit 50.

Liquid oxygen is fed from the oxygen supply tank 33 through a control valve 52, conduit 54, an oxidizer pump 55 driven by the main turbine 42, then through a main oxidizer control valve 56 and conduit 58 into the injector head 28. When the rocket vehicle reaches a high altitude and leaves the Earth's atmosphere, launch efficiency can be increased by using propellant components that create toxicity risks at lower altitudes. Such components can be metallic additives to the fuel or more efficient oxidizers, for example liquid fluorine. Phases of the flight above atmospheric can use a fluorine-oxygen mixture in the ratio of about 50 percent each. This mixture is denser than the liquid oxygen and can be stored under the same cryogenic conditions. To this end, the fluorine storage tank 35 is connected to the main oxidizer supply line 58 through a liquid fluorine control valve 59. The oxygen and fluorine control valves 52, 59 are adjusted during flight to provide the desired ratio of oxidizers. The fluorine and oxygen are preferably stored as the mixture in one tank thermally integrated with the tank of the liquid oxygen.

The injector head 28 feeds metered amounts of fuel and oxidizers which are burned in the combustor chamber to produce hot gases that then flow through the engine throat and nozzle and are ejected to produce the desired thrust. The thrust produced by the burning gases propels the rocket engine and vehicle, and by the use of the various control valves for controlling of the flow of fuels and oxidants as described below, the optimum thrust performance can be maintained.

Figure 2:
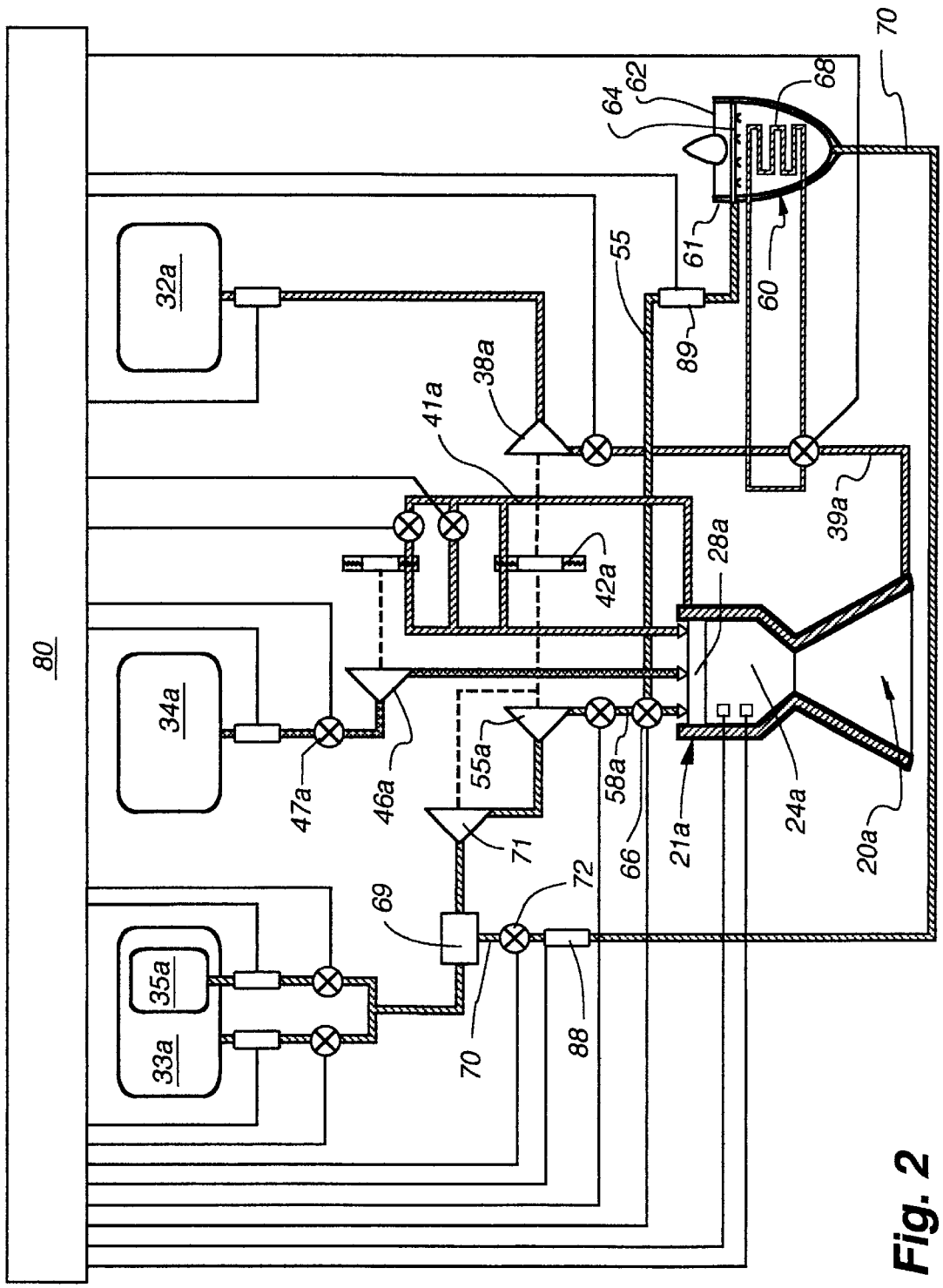
FIG. 2 is a diagrammatic cross-sectional view of a multi-propellant multi-mode liquid air augmented rocket engine (LAARE) embodiment of the present invention.

Another embodiment of the present invention is shown in FIG. 2. In describing this embodiment, similar reference numerals will be used with the distinguishing suffix "a." This modification comprises a rocket engine 20a of the foregoing character and an associated air cooling and liquefaction unit 60 for producing liquid air at atmospheric altitudes to augment the oxidizer, conventionally liquid oxygen. The rocket engine 20a is constructed with a combustor 21a defining a combustor chamber 24a opening through a throat 25a into a wide exhaust nozzle 26a. A propellant fuel, such as liquid hydrogen, is supplied to the combustor injector head 28a from a fuel tank 32a through a control valve 40a and combustor jacket 29a and cooling chamber 30a by a fuel pump 38a driven by a expanded hydrogen turbine 42a. A supplemental fuel such as a hydrocarbon is fed to the injector head 28a from a supply tank thereof 34a through a control valve 47a by a pump 46a driven by a turbine 48a. A propellant oxidizer, such as liquid oxygen, is fed to the combustor injector head 28a from a supply tank 33a through a control valve 52a by an oxidizer pump 55a. At higher altitudes, liquid fluorine oxidizer is fed from a supply tank thereof 35a through a control valve 59a by the pump 55a. The pumps 38a and 55a are driven by a main turbine 42a operatively connected thereto and powered by expanding a portion of the liquid hydrogen fuel.

The air cooling and liquefaction unit 60 is formed by a liquefaction chamber 61 having an air inlet 62. Liquid oxygen is introduced into the incoming air for initial cooling and moisture freezing-out purposes through an oxidizer injection system or manifold 64. Liquid oxygen flows to the manifold from the main oxygen line 58a through a conduit 65 and control valve 66 in the main line 58a. The mixed air and oxidizer is further cooled and liquefied in the chamber 61 by contact with a heat exchanger and condenser 68 in the chamber 61. A mixer 69 in the main conduit 58a receives liquid and saturated air from the liquefaction unit 60 through a conduit 70 and mixes it with the liquid oxidizer such as liquid oxygen from the oxidizer supply tank 33. Because the mixer 69 has a low suction head, a low pressure turbopump 71 may be utilized to feed the mixed oxidizer from the mixer 69 to the oxidizer pump 55a in order to prevent cavitation therein. A control valve 72 may be provided in the liquid air conduit 70 to provide for liquefied air mode operation and subsequent transition of the engine to an all-rocket mode.

The engine 20 is able to operate on both a liquefied air cycle mode and all-rocket mode. The former mode is characterized by use of a liquid air and oxygen mixture as an oxidizer. In the all-rocket mode only liquid oxygen is used as the oxidizer. When operating in the liquid air cycle, air captured through air inlet 62 is cooled and partially liquefied in the condenser 68 cooled by the liquid hydrogen fuel as a coolant. In order to prevent heat exchanger performance deterioration as a result of icing, the incoming air is cooled prior to entering the condenser 68 to a temperature below the water triple point (273.15K) by injection of liquid oxygen from the oxidizer injection manifold 64. Air from the heat exchanger and condenser 68 is in saturated condition with a liquid mass content of more than 80%. Liquefaction is accomplished in the mixer 69 where cold saturated air meets the higher flow rate of on-board oxygen which can be subcooled (55K) to liquefy more air. The liquid air and liquid oxygen product of the mixer 69 is a slightly subcooled liquid oxidizer that provides cavitation-free operation of the oxidizer pump 55a. The low-pressure turbopump 71 is also used for obtaining better anti-cavitation characteristics in the oxidizer feeding system.

Liquid hydrogen from the heat exchanger and condenser 68 flows to the combustor 26 through the combustor cooling jacket 29a. Liquid oxidizer from the oxidizer pump 55a is supplied to the combustor 21a of the rocket engine 20a along with liquid hydrogen fuel pumped by pump 38a driven by driving turbine 42a. Combustion products are expanded through the nozzle 26a to generate thrust. After the initial acceleration of the engine, when the humidity of the atmospheric air cannot cause precooler icing, the valve 66 stops liquid oxidizer flow into the oxidizer injection system 64. A reasonable speed of transition to an all-rocket mode corresponds to Mach=6–7. Operation of the airbreathing system above this speed is not beneficial because of cooling requirements. At the transition Mach number, about mach 6.0–6.5, air liquefaction is ceased and the engine 20 operates as a pure rocket engine with liquid hydrogen fuel and liquid oxygen oxidizer.

The operation of the engine whether the modification shown in FIG. 1 or the modification shown in FIG. 2 as described above is controlled by a computer 80. The computer receives combustor gas temperature and pressure data from a temperature sensor 81 and a pressure sensor 82 in the combustor chamber 24. The flow rate of propellant components is measured by flowmeters 84, 85, 86, 87, 88 and 89 measuring the flow of liquid oxygen, liquid fluorine, liquid hydrocarbon fuel, liquid hydrogen fuel, liquefied air, and liquefied oxidizer fed to the air liquifaction unit 60, respectively. All control valves are connected to and their operation is controlled by the computer 80. The computer calculates the optimum mass flow rate of the propellant components, the characteristic exhaust velocity of the exhaust gases produced in the combustor according to the gas temperature and pressure, the composition of the propellant components and other necessary parameters, and controls the flow of propellant components to the injector head 28 as described to achieve the desired performance characteristics.

Figure 3:
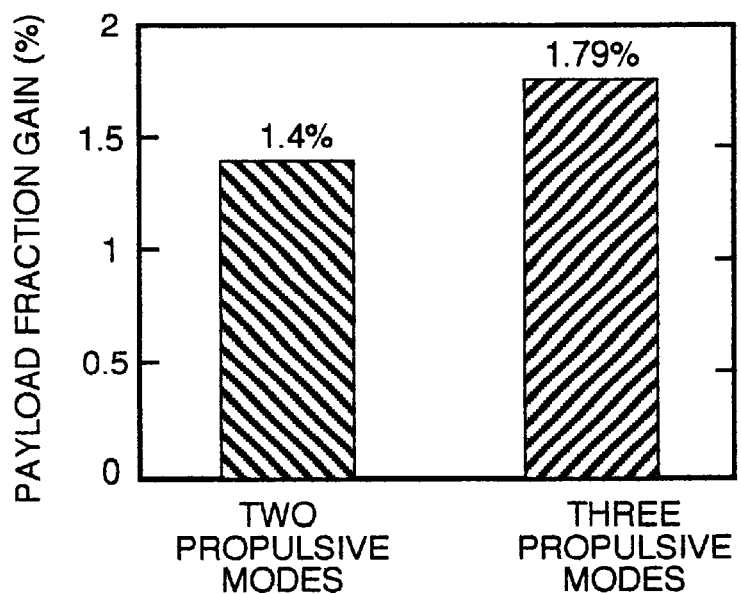
FIG. 3 is a bar graph showing the projected percent payload fraction gain for different propulsive modes compared to a basic expander type rocket engine.
Figure 4:
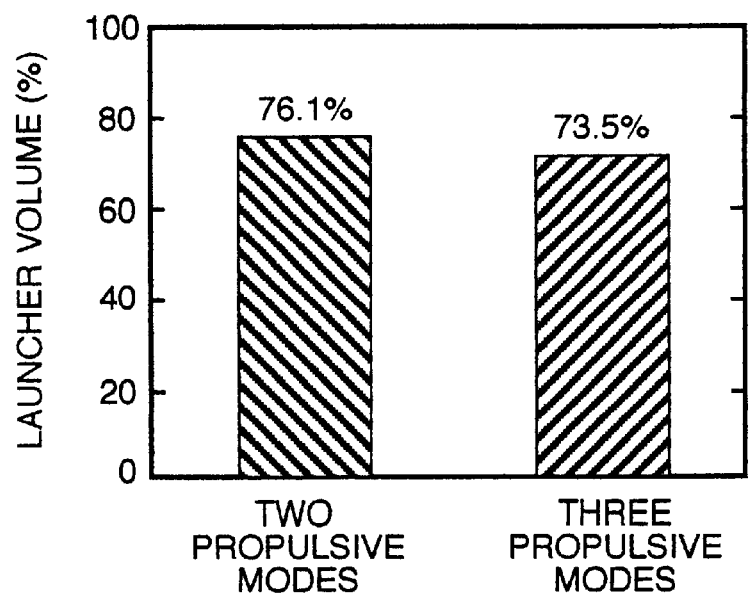
FIG. 4 is a bar graph showing the projected percent launcher volume for different propulsive modes compared to a basic expander type rocket engine.

FIGS. 3 and 4 show the benefits of multipropellant rocket engine application to SSTO launcher compared to a conventional LOX/LH2 liquid rocket engine. FIG. 3 shows this benefit in the form of the payload fraction gain to the low earth orbit of 407 km, which fraction is given as a percentage of the launcher gross take-off weight. It is seen from the FIG. 3 that when two propulsive modes are employed (LOX/LH2/kerosene combination from SLS to 28 km), payload fraction gain counts for 1.4%. When a third mode is added (FLOX/LH2 at the altitude above 150 km), payload fraction gain increases to 1.79%. It should be noted that the existing launchers provide payload fraction to the low earth orbit in the vicinity of 2–3% of the gross take-off weight. FIG. 4 shows that both two- and three-propulsive mode engines provide significant volume reduction of the launcher due to hydrogen fraction reduction. The volume of the two considered launchers are respectively 76.1 and 73.5% of the basic launcher with single mode LOX/LH2 propulsion.

This significant volume reduction provides up to 20% of the vehicle drag reduction that, in turn, increases launcher efficiency. Engine thrust-to-weight reduction for SLS conditions in the considered example counts for 40% compared to the basic LOX/LH2 engine.

In the case of a liquid air augmented rocket engine or LAARE, the following flight scenario from take-off to earth orbit or suborbital conditions occurs:

1) Initial launch or take off and acceleration from sea level conditions to moderate hypersonic speed, usually about Mach 6–6.5. The rocket engine, which conventionally operates with a liquid oxygen and liquid hydrogen or LOX/LH2 propellant system, utilizes liquefied ambient air added to LOX to increase thrust and specific impulse during take-off and initial acceleration to moderate hypersonic speed. Hydrocarbon fuel can also be used in this mode for additional efficiency.

2) Major part of acceleration and ascent. The rocket engine operates in its primary design mode with a LOX/LH2 propellant producing moderate thrust and high specific-impulse during the major part of the acceleration, from about Mach 6–6.5 towards orbital or suborbital speed. Final acceleration can be completed with or without high energy fuel additive to the LOX/LH2 propellant.

Figure 5:
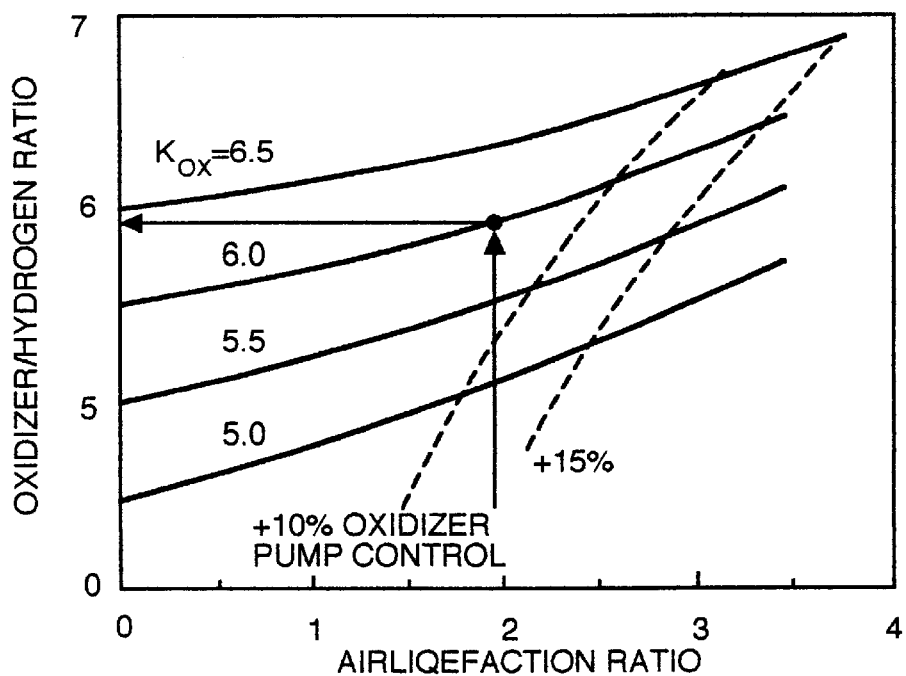
FIG. 5 is a graph showing the theoretical relationship of the oxidizer/hydrogen ratio to the air liquefaction ratio for selected oxygen/hydrogen ratios.

FIG. 5 shows the oxidizer/hydrogen ratio $(K_X+K_A)$ in the LAARE mode as a function of the air liquefaction ratio $K_A$ where $K_A=0$ corresponds to the all-rocket mode, for different oxygen/hydrogen ratios $(K_{OX}=5.0–6.5)$ in the rocket mode. Assuming that the oxygen/hydrogen mixture ratio in the second or rocket mode is $K_{OX}=6.0$ and the initial air liquefaction ratio is $K_A=2.0$, a vertical arrow line is drawn from the air liquefaction ratio axis to the line corresponding to $K_{OX}=6.0$. Next, a horizontal arrow line is drawn to the oxidizer/hydrogen ratio axis. The obtained value of the oxidizer/hydrogen ratio $(K_X+K_A)=6.42$ in the LAARE mode effectively matches the selected rocket mode $K_{OX}=6.0$.

Assuming that the hydrogen flow rate is the same in both operational modes in this example, the oxidizer flow rates are proportional to the indicated ratio numbers, i.e., 6 in the second or rocket mode and 6.42 in the first or LAARE mode. This means that the flow rate through the oxidizer turbopump in this example is just 7% higher in the LAARE operational mode. This number is definitely within the control range of modern turbopumps. In the engine shown in FIG. 2 incorporating the LAARE Cycle, it is simple to increase turbopump power in the LAARE mode, because hydrogen, which is the turbopump driver, is additionally heated in this mode in the heat exchanger/condenser as compared to the all-rocket mode. The dotted lines in FIG. 5 correspond to +10% and +15% oxidizer pump flow rate control. The LAARE Cycle engine accordingly does not require additional pumps, turbines or compressors or exotic and complicated means to increase the air liquefaction ratio, as in the prior art Liquid Air Cycle Engine (LACE) Cycles. See, for example, U.S. Pat. No. 4,393,039, and U.S. Pat. No. 5,025,623. High-pressure pumps and their drivers are used in both the LAARE and all-rocket modes. This results in a substantial increase in the engine thrust-to-weight ratio compared to prior art engines.

Figure 6:
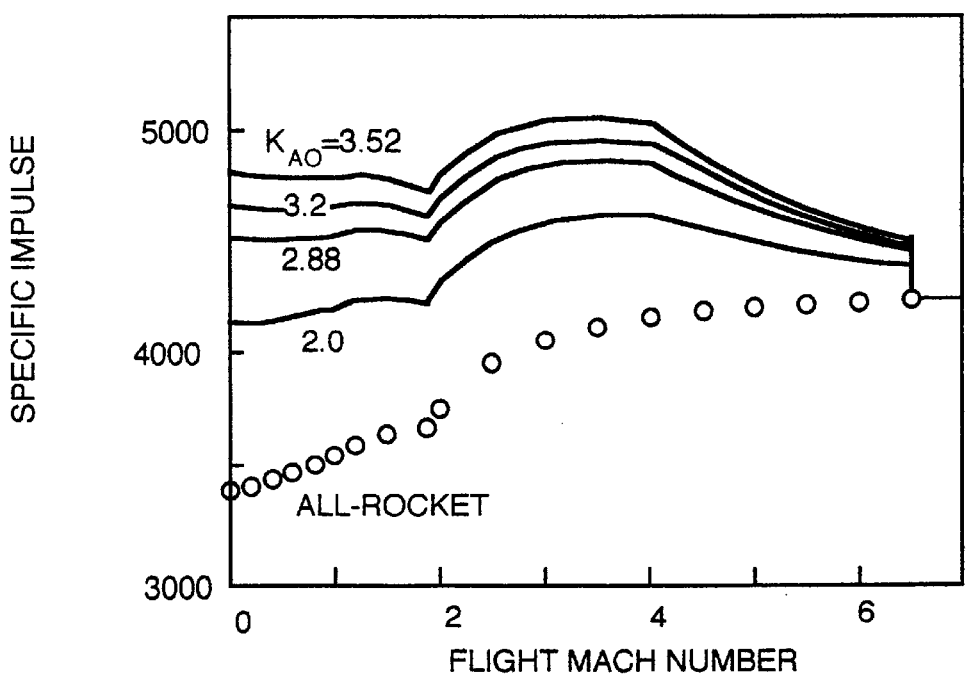
FIG. 6 is a graph showing the theoretical relationship of the specific impulse to the flight Mach number as a function of various air liquefaction ratios.
Figure 7:
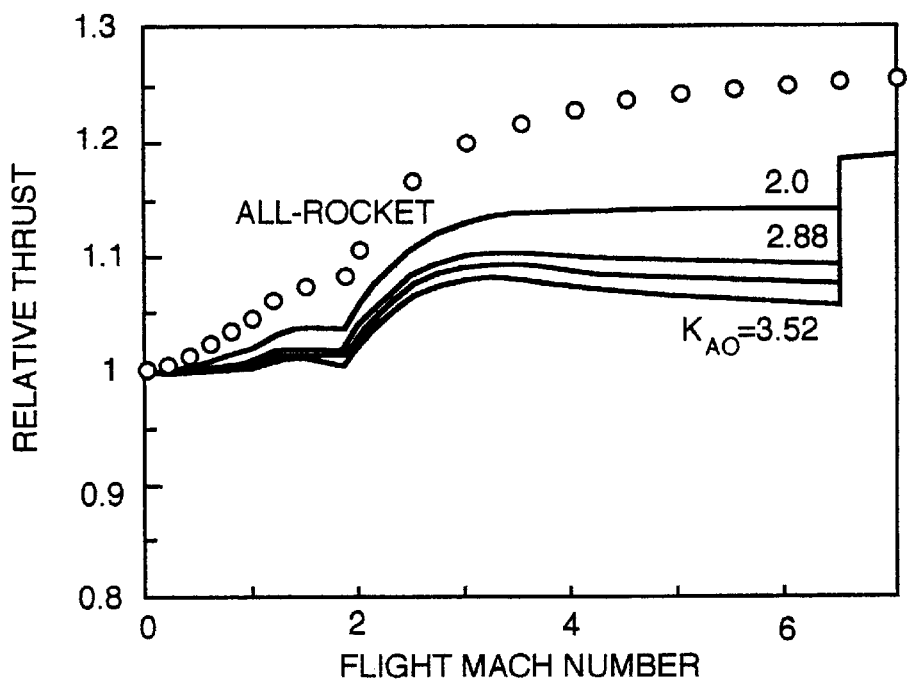
FIG. 7 is a graph showing the theoretical relationship of relative thrust to the flight Mach number as a function of various air liquefaction ratios.

LAARE Cycle benefits are possible because of the unique combination of its parameters. FIGS. 6 and 7 present a projected comparison of the estimated specific impulse and relative thrust for the LAARE Cycle engine with different air liquefaction ratios and pure rocket LH2/LOX propulsion. It is estimated that LAARE Cycle engine's specific impulse will be higher, for example, at sea level, an estimated 30% higher, than that of a conventional rocket engine. Substantial thrust deterioration along the trajectory is a typical weakness of the air-breathing accelerators, which results in engine oversize. In the case of a LAARE or air liquefaction Cycle engine, estimated thrust is high under sea level conditions and is projected to be higher and nearly constant during acceleration, as shown in FIG. 7. The combination of these two parameters provides a favorable estimated effective specific impulse, which along with exceptional engine thrust-to-weight ratio, produces a high launcher efficiency.

The LAARE Cycle engine makes feasible systems that are not feasible with all-rocket propulsion for small- or mid-size reusable SSTO launchers. A LAARE Cycle launcher may create a new market for on-demand, small payload launch services. Additionally, it may boost space commerce activities including space manufacturing. The LAARE Cycle is also an attractive propulsion option for both a suborbital global-reach vehicle and a space station resupply vehicle. A LAARE Cycle engine application to a small vertical takeoff SSTO launcher was considered in Ref. 3 (V. Balepin and P. Hendrick, "Lightweight Low Cost KLIN Cycle Rerivative for a Small Reusable Launcher," ALAA Technical Paper 99–4893, 1999).

Figure 8:
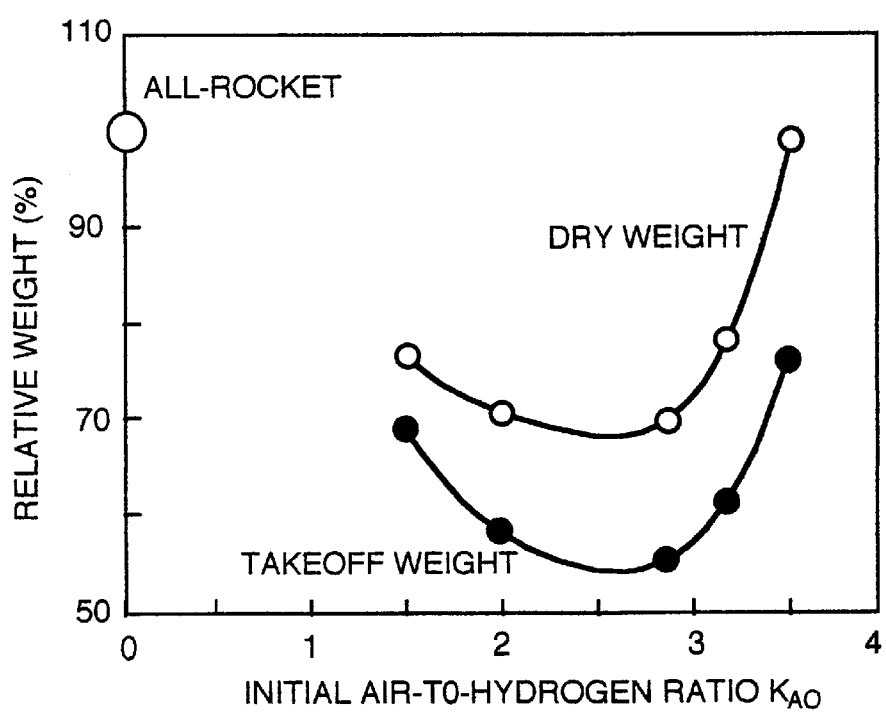
FIG. 8 is a graph showing a theoretical comparison of the relative percentage of rocket weights to the initial air to hydrogen ratio for an all-rocket launcher and for a liquid air augmented rocket engine.

FIG. 8 presents a projected comparison of a LAARE Cycle launcher to an all-rocket launcher in terms of relative gross takeoff weight (GTOW) and dry weight, with corresponding parameters of all-rocket launcher taken as 100%, as a function of the initial air liquefaction ratio $K_{AO}$. According to FIG. 8, the GTOW and dry weight of a BANTAM-class launcher, launching a 330 pound (lb) payload to 220 nautical miles (nmi) orbit, utilizing the LAARE Cycle, could be reduced by 45% and 30%, respectively, as compared to the all-rocket launcher. The best launcher efficiency corresponds to $K_{AO}$=2.0–3.0.

Several improvements can be incorporated into the LAARE Cycle engine based on the expander cycle rocket engine. The LAARE Cycle working process in the combined cycle mode is accompanied by "enthalpy injection" from incoming air into the hydrogen fuel. The hydrogen temperature upstream of the combustor cooling jacket is 50–80 Kelvin (K) higher, depending on the air liquefaction ratio in this mode as compared to the rocket mode, which affords a significant increase in the turbine power and combustor pressure and flow rate.

The rocket engine is designed with a combustor having the requisite fixed or variable nozzle area, and the appropriate propellant fuels and oxidizers for producing the desired thrust. The fuel combinations, flow rates and ratios are selected to provide a high density-impulse fuel during the first mode and a high specific impulse during the second mode of operation. The speed of the rocket in flight and various controllable engine parameters are sensed by sensors and meters. The nozzle area, the flow and ratios of the propellant components, and other variable parameters are controlled by appropriate mechanisms and control valves and are maintained during flight by a suitable control circuit which may include a computer for receiving the data from the rocket and rocket engine and controlling the rocket's flight.

While illustrative embodiments of the present invention have been shown in the drawings and described above in considerable detail, it should be understood that there is no intention to limit the invention to the specific forms disclosed. On the contrary the intention is to cover all modifications, alternative constructions, equivalents, methods and uses falling within the spirit and scope of the invention as expressed in the appended claims.

What is claimed is:

1. A multi-mode multi-propellant rocket engine capable of operating in a plurality of selected modes comprising, in combination, a combustor chamber opening through a throat into a wide nozzle;

a propellant injector head in said combustor chamber;

a propellant fuel supply tank containing liquid hydrogen;

a propellant oxidizer supply tank containing liquid oxygen;

a jacket covering said combustor chamber and nozzle and defining therewith a heat exchange chamber;

a hydrogen pump for supplying liquid hydrogen fuel from said hydrogen supply tank through said jacket heat exchanger to said injector head;

a control valve for controlling the supply of liquid hydrogen to said injector head;

an air liquefaction chamber for receiving and liquefying air;

a mixer for receiving liquefied air from said air liquefaction chamber and liquid oxygen from said oxygen supply tank and mixing the same;

an oxidizer pump for supplying liquid oxygen from said oxidizer supply tank to said injector head, for supplying a mixture of liquid oxygen and liquid air to said injector head and for supplying a mixture of liquid oxygen and liquid air to said air liquefaction chamber;

a spray manifold in said air liquefaction chamber for receiving said liquid air and liquid oxygen mixture and spraying the same into the air being liquefied;

a heat exchanger in said air liquefaction chamber for receiving liquid hydrogen from said liquid hydrogen supply pump, said liquid hydrogen heat exchanger cooling said air to effect liquefaction thereof;

a control valve for controlling the supply of liquefied air and injected oxygen to said mixer;

an oxygen pump for supplying liquid oxygen and liquid air oxidizer from said mixer to said injector head;

a control valve for controlling the supply of liquid oxygen and liquid air to said injector head;

and a turbine for operatively receiving a supply of expanded hydrogen for driving said hydrogen pump and said oxygen pump; the operation of said control valves determining and controlling the ratio of propellant fuel and oxidizer components in each mode of operation of the rocket engine.

2. A multi-mode multi-propellant rocket engine capable of operating in a plurality of selected modes comprising, in combination, a combustor chamber opening through a throat into a wide nozzle;

a propellant injector head in said combustor chamber;

a propellant fuel supply tank containing liquid hydrogen;

a propellant fuel supply tank containing liquid hydrocarbon;

a propellant oxidizer supply tank containing liquid oxygen;

a jacket covering said combustor chamber and nozzle and defining therewith a heat exchange chamber;

a hydrogen pump for supplying liquid hydrogen fuel from said hydrogen supply tank through said jacket heat exchanger to said injector head;

a control valve for controlling the supply of liquid hydrogen to said injector head;

a hydrocarbon pump for supplying liquid hydrocarbon fuel from said hydrocarbon tank to said injector head;

a hydrogen driven turbine controllably driving said hydrocarbon pump;

an air liquefaction chamber for receiving and liquefying air;

a mixer for receiving liquefied air from said air liquefaction chamber and liquid oxygen from said oxygen supply tank and mixing the same;

an oxidizer pump for supplying liquid oxygen from said oxidizer supply tank to said injector head, for supplying a mixture of liquid oxygen and liquid air to said injector head and for supplying a mixture of liquid oxygen and liquid air to said air liquefaction chamber;

a spray manifold in said air liquefaction chamber for receiving said liquid air and liquid oxygen mixture and spraying the same into the air being liquefied;

a heat exchanger in said air liquefaction chamber for receiving liquid hydrogen from said liquid hydrogen supply pump, said liquid hydrogen heat exchanger cooling said air to effect liquefaction thereof;

a control valve for controlling the supply of liquefied air and injected oxygen to said mixer;

an oxygen pump for supplying liquid oxygen and liquid air oxidizer from said mixer to said injector head;

a control valve for controlling the supply of liquid oxygen and liquid air to said injector head;

and a turbine for operatively receiving a supply of expanded hydrogen for driving said hydrogen pump and said oxygen pump;

the operation of said control valves determining and controlling the ratio of propellant fuel and oxidizer components in each mode of operation of the rocket engine.

3. A rocket engine as defined in claim 1 or 2 further comprising sensors in said combustor for monitoring the temperature and pressure of the gases therein; flowmeters for monitoring the flow of each propellant component; and a computer operative in response to the temperature and pressure of said gases, the flow rates of said propellant components, and the chemical composition of said propellant components for controlling said control valves to control the supply of propellant components to said injector head in each mode of operation of the rocket engine.

* * * * *